E. O. SCHWEITZER & A. HERZ.
FUSE DEVICE.
APPLICATION FILED AUG. 20, 1915.
1,287,462.
Patented Dec. 10, 1918.
6 SHEETS—SHEET 1.
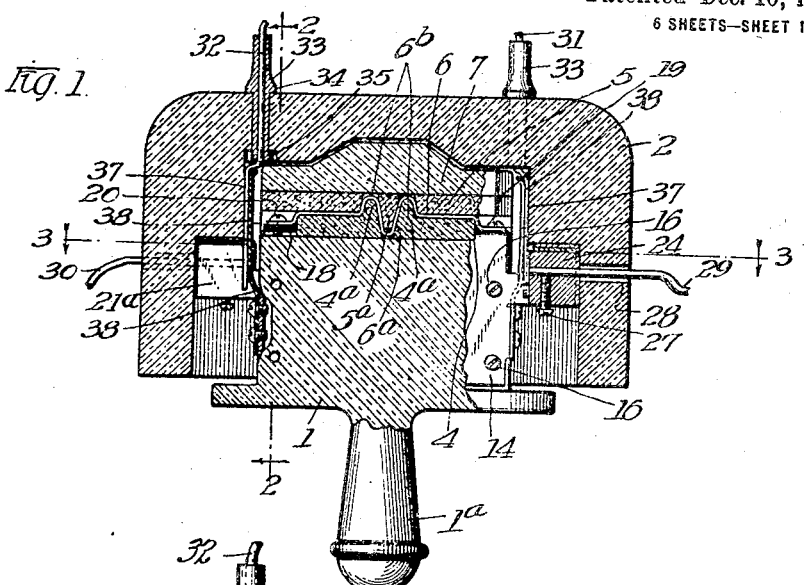
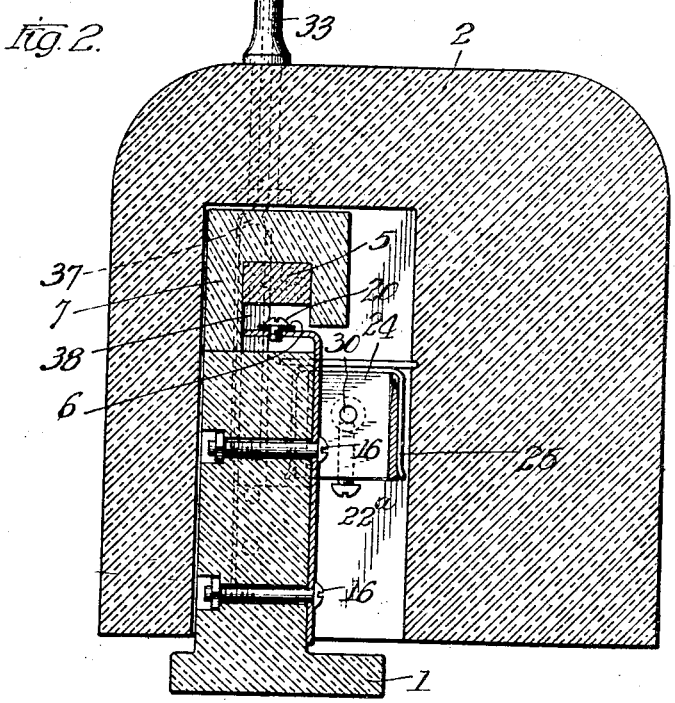
Witnesses:
Inventors
Edmund O. Schweitzer
Alfred Herz

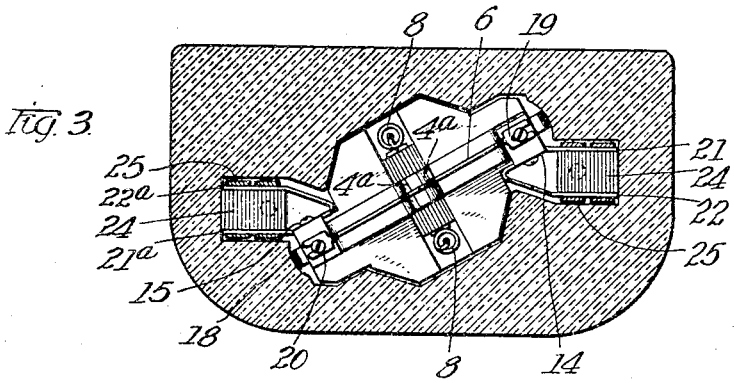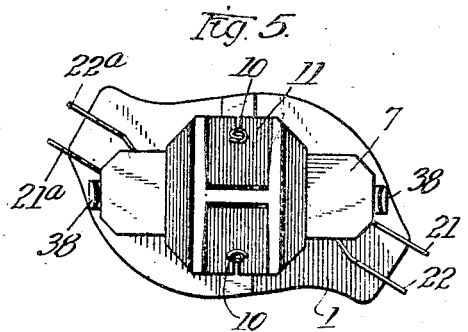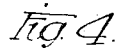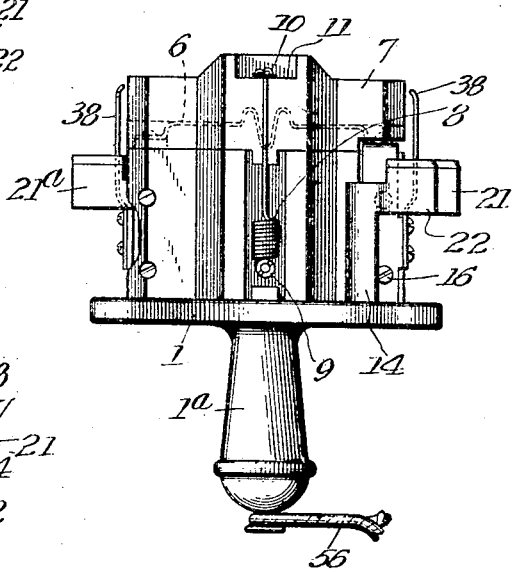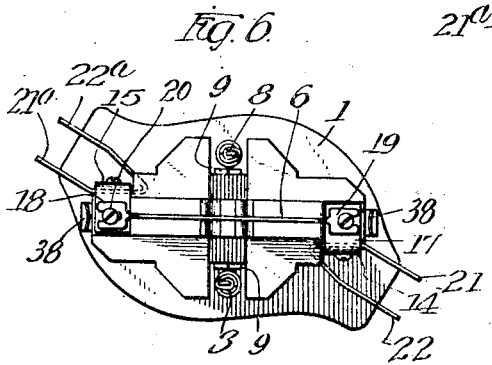

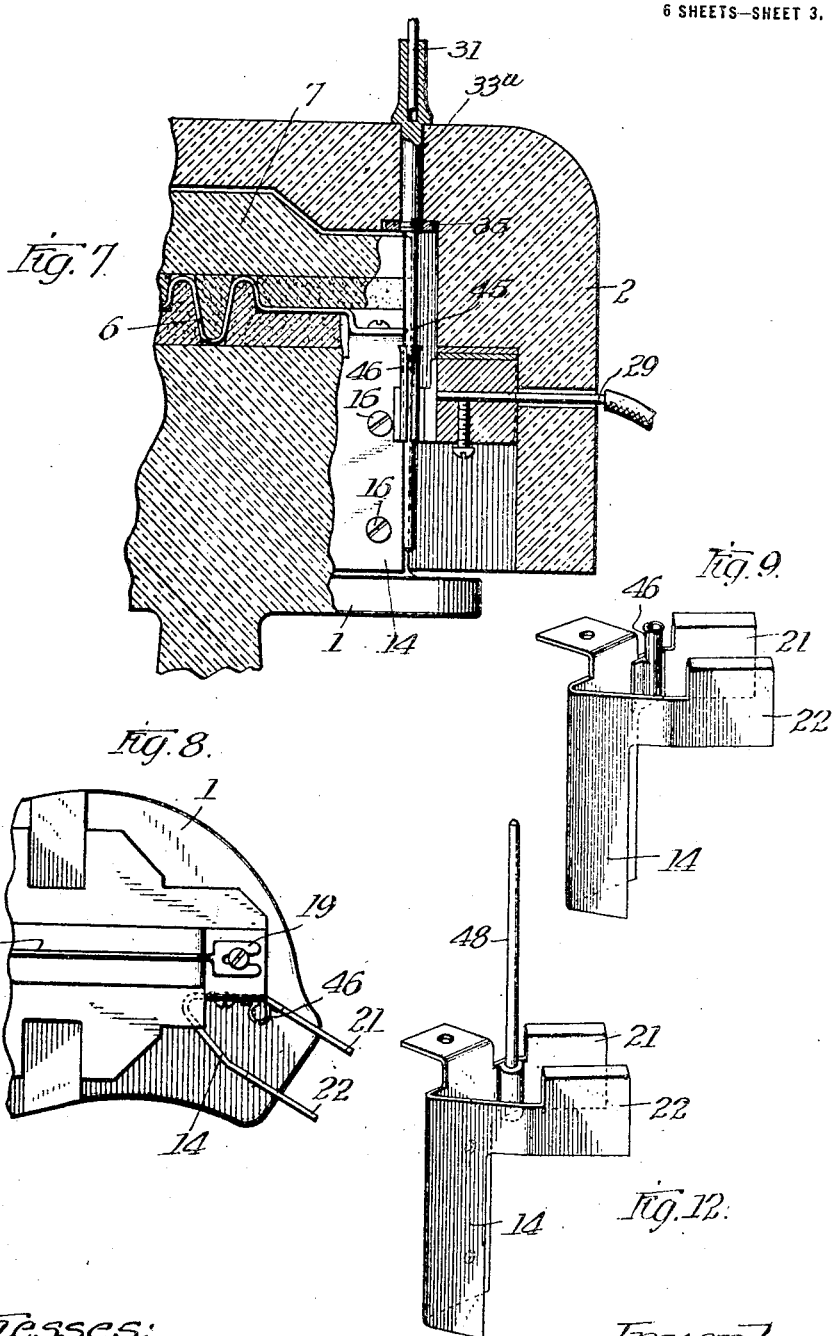

E. O. SCHWEITZER & A. HERZ.
FUSE DEVICE.
APPLICATION FILED AUG. 20, 1915.
1,287,462.
Patented Dec. 10, 1918.
6 SHEETS—SHEET 4.
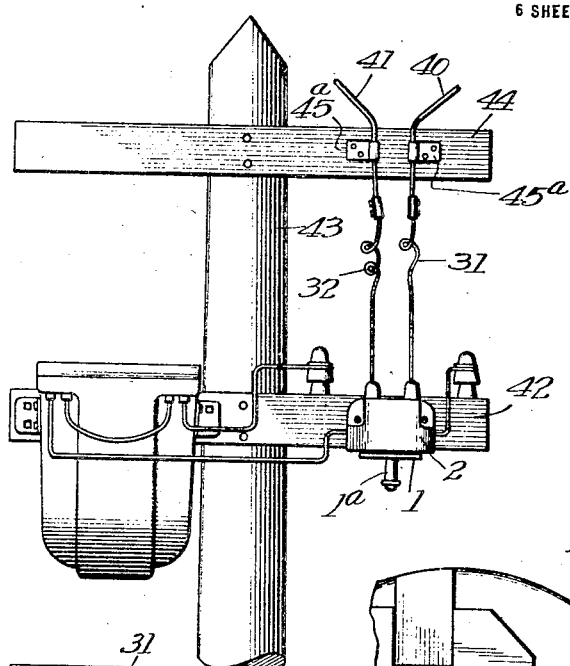
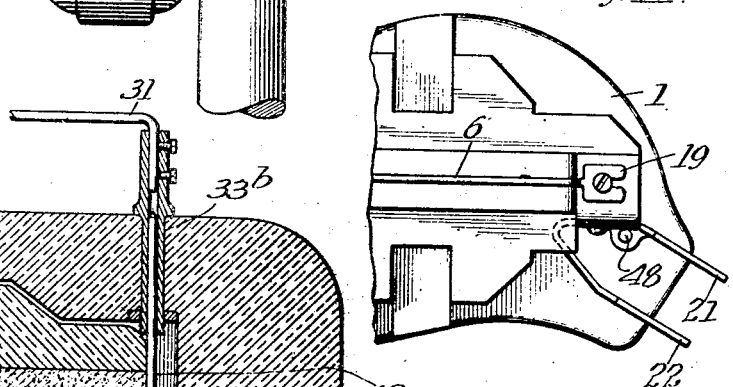
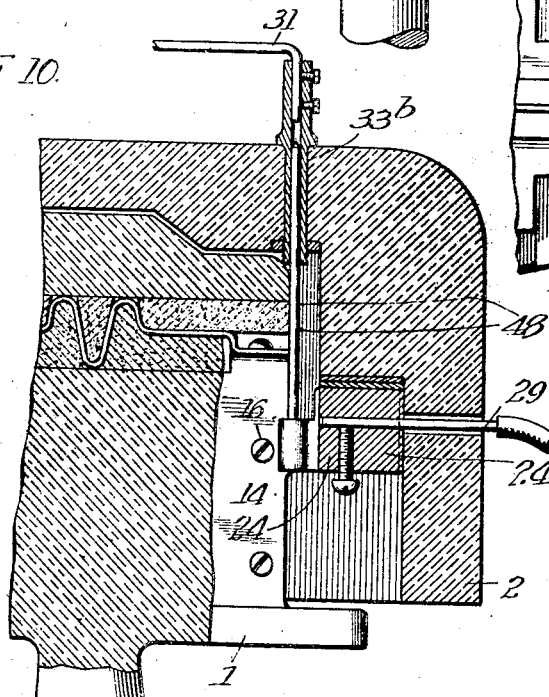
Witnesses:
Robert H. Weir
Arthur W. Carton
Inventors,
Edmund O. Schweitzer
Alfred Herz E. O. SCHWEITZER & A. HERZ.
FUSE DEVICE.
APPLICATION FILED AUG. 20, 1915.
1,287,462.
Patented Dec. 10, 1918.
6 SHEETS—SHEET 5.
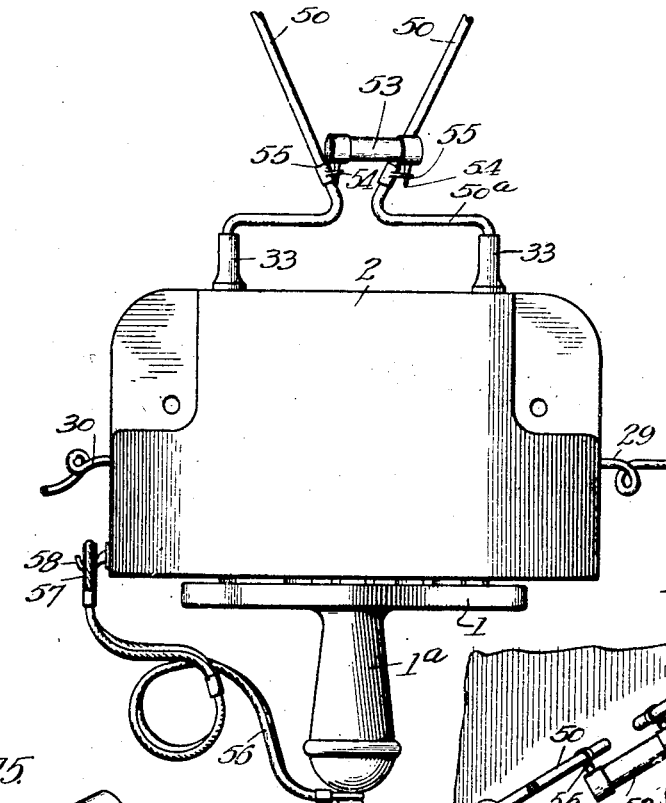
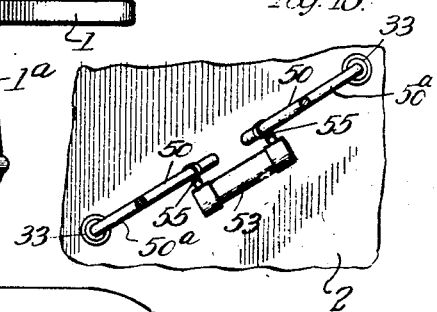
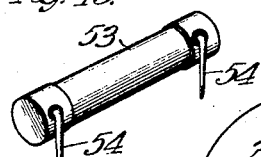
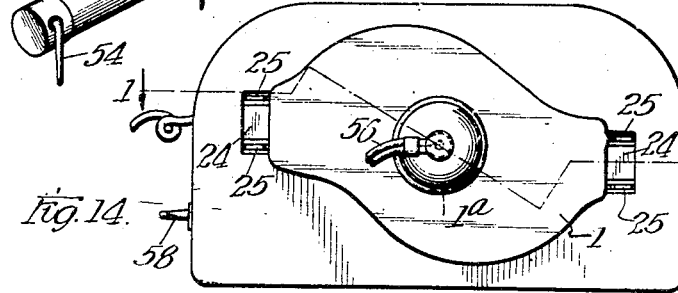
Witnesses:
Robert F. Weir
Arthur W. Carton
Inventors.
Edmund O. Schweitzer
Alfred Herz

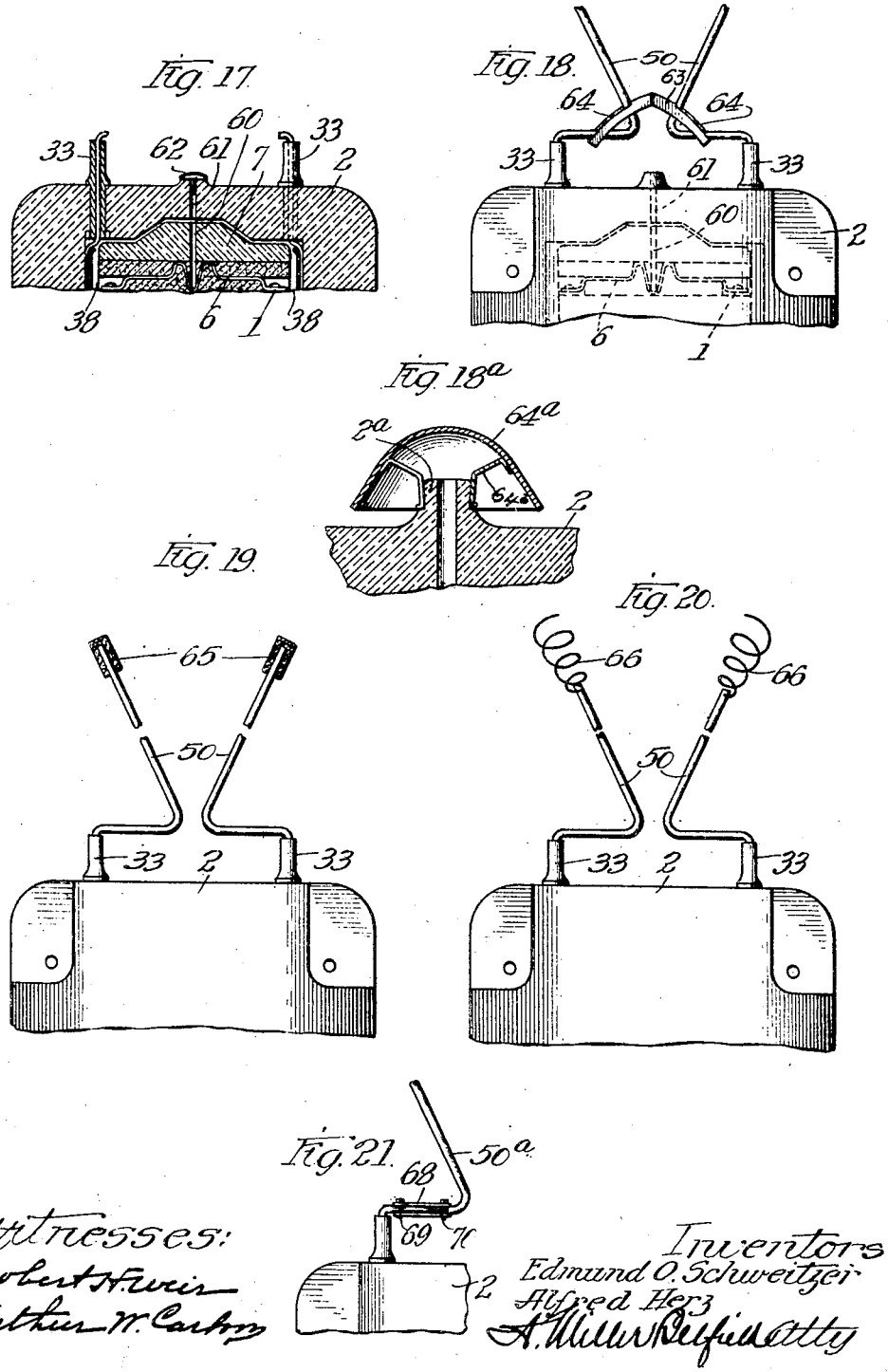

UNITED STATES PATENT OFFICE.

EDMUND O. SCHWEITZER AND ALFRED HERZ, OF CHICAGO, ILLINOIS.

FUSE DEVICE.

1,287,462.  Specification of Letters Patent.  Patented Dec. 10, 1918.

Application filed August 20, 1915. Serial No. 46,513.

*To all whom it may concern:*

Be it known that we, EDMUND O. SCHWEITZER and ALFRED HERZ, citizens of the United States, residing at Chicago, in the county of Cook and State of Illinois, have invented a certain new and useful Improvement in Fuse Devices, of which the following is a full, clear, concise, and exact description, reference being had to the accompanying drawings, forming a part of this specification.

Our invention relates to fuse devices, and especially to fuse devices intended for outdoor overhead work, although it is also frequently used for protective purposes in electric stations as well.

Prominent objects of the invention are to provide a simple, practical and effective construction of fuse device, to secure a high degree of efficiency; to shorten the necessary length of the fuse, thereby reducing the amount of vapor generated when the fuse blows and the expense of fuse renewals; to arrange for the easy and quick manipulation of the device to permit the renewal of a fuse; to arrange for the effective dissipation of excess energy, to provide a by-pass for lightning to protect the fuse block, and to provide simple and expeditious means for associating the same with the fuse structure and connecting it therewith, and to secure the foregoing and other desirable results in a simple and expeditious manner.

In the accompanying drawings Figure 1 is a vertical section of a fuse device embodying our present invention, taken on line 1—1 in Fig. 14;

Fig. 2 is a cross section taken on line 2—2 in Fig. 1 on an enlarged scale;

Fig. 3 is a cross section taken on line 3—3 in Fig. 1;

Fig. 4 is an elevation of the fuse carrying member removed from the other member of the device;

Figs. 5 and 6 are plan views of said fuse carrying member, Fig. 5 showing a compression block for the fuse in place, and Fig. 6 showing said block removed;

Fig. 7 is a vertical section of a modified form of the device;

Figs. 8 and 9 are views of details of construction in said modified form;

Fig. 10 is another modified form; and Figs. 11 and 12 details of construction in the same;

Fig. 13 is a still further modified form, Fig. 14 a bottom plan view of the same; and Figs. 15 and 16 views of details of construction therein;

Figs. 17, 18, 18$^a$, 19, 20 and 21 are views of still further modified forms;

Fig. 22 is a view showing the use of the device in connection with a transformer and mounted upon an outdoor pole.

Referring first to Figs. 1 to 6, inclusive, we show a device embodying a plug member 1, and a socket member 2 into which the plug member 1 is adapted to fit. These two members are preferably made of insulating material, such as porcelain or the like. The plug member 1 is intended to fit removably in place in the chamber or socket formed in the socket member 2, and said plug member is intended for ready removal therefrom and replacement therein, and preferably carries the fuse so that the fuse may be renewed by the removal of the plug member from the socket member. To such end the plug member 1 is conveniently provided with members 4 and 5, preferably made of some particularly refractory and heat resisting, electrically insulating material, such for example as limestone, slica, carborundum, or similar material. These members 4 and 5 are to be placed on opposite sides of a fuse 6, the member 4 below and the member 5 above said fuse. The member 4 is preferably secured firmly to the body portion of the plug member 1, but the upper member 5 is mounted removably upon the fuse and conveniently forms the lower portion of a removable block or member 7 which is held firmly but removably in place above the fuse 6 with the damping member 5 in contact with the same. The block 7 is conveniently held in place by springs 8 whose lower ends are secured at 9 (Fig. 4) to the plug member 1 and whose upper ends are provided with loops or projections 10 which rest upon shoulders 11 on the fuse damping or compression block 7, thereby holding said block downwardly upon the fuse and placing the latter under compressive force. The fuse 6 is preferably made in irregular form with lateral deviations as shown in Fig. 1, assisting to prevent the maintenance of arcing, and the compression or damping members 4 and 5 are constructed accordingly, the member 4 being provided with a central recess in which the fuse bend 6$^a$ may fit and with projections 4$^a$—4$^a$, and the member 5 being provided with recesses in which the fuse bends 6$^b$—6$^b$ may fit and with a projection 5ª fitting into the fuse bend 6ª. Thus an irregular path is formed for the fuse with barriers for the arc to tend through magnetic reactions to extinguish the same.

The plug member 1 is provided with metallic contacts 14 and 15 at the opposite sides or ends thereof. These contacts are secured to the plug member by screws 16 and have their upper ends bend laterally across the upper portion of the plug member 1, as shown at 17 and 18. The ends of the fuse 6 are secured to these contacts 17 and 18 as by screws 19 and 20. Thus substantially the entire length of the fuse is effective and active and thereby its length is reduced as much as possible. The metallic strips 14 and 15 are also provided with laterally projecting metallic contact clips 21 and 22, 21ª and 22ª, respectively. These clips are preferably made integral with the metallic strips 14 and 15 respectively. They are for the purpose of making connection with coöperating contact jaws on the socket member 2. Such contact jaws preferably comprise metallic blocks 24 having downwardly extending side members 25 on opposite sides of the plugs 24, the space between the blocks 24 and the side clips 25 forming sockets or recesses to receive the clips 21, 22 and 21ª, 22ª. Thus when the plug member 1 is inserted in the socket member 2 the side clips 21, 22, 21ª and 22ª will fit into the recesses or jaws formed by the blocks 24 and side clips 25, and thus establish mechanical connection sufficient to hold the plug 1 in place in the socket 2, and also establish electrical connection between the fuse 6 and the socket contact members or terminals 24. As an arrangement for connecting the line wires to the terminals 24 we provide the same with screws 27 and provide the socket 2 with side apertures 28, into which conductors 29 and 30 may be led, the same being held in position by the screw 27.

We also provide an arrangement for dissipating excess energy or arcs, which will now be described. This arrangement comprises conductors 31 and 32 which are led through the top of the socket member 2, as shown in Fig. 1. Tubular metallic members 33 are preferably provided for the entrance of the conductors 31 and 32, said members 33 fitting securely in the top of the socket member 2 and being held in place by shoulders 34 to engage the upper surface of the socket 2 and by nuts 35 engaging the lower ends of said members 33 inside of said socket member 2. The conductors 31 and 32 extend downwardly within the interior chamber or socket of the member 2 and are widened to form broad contacting surfaces 37 (Fig. 2). Coöperating contact strips 38 are secured to the metal strips 14 and 15 and are so arranged that as the plug member 1 is inserted into the socket member 2, the strips 38 will contact with the strips 37 and thereby form metallic connection between the line wires 29 and 30 and the conductors 31 and 32. These latter are extended upwardly as shown in Fig. 22 to metallic energy dissipating or arc discharging devices 40 and 41 conveniently in the form of metal arms or horns. These latter are shown mounted well above the fuse device in some remote position, as for example as illustrated in Fig. 22, the fuse device is shown mounted upon one cross arm 42 on a pole 43 and the arms or horns 40 and 41 mounted upon another cross arm 44 on said pole brackets 45 of insulating material being conveniently provided for the purpose of mounting said members 40 and 41. The conductors 31 and 32 being connected to the lower ends of the members 40 and 41 convey to said members the potential of the line and said members being bars, conductors present points or surfaces between which arcs may be established when an excessive energy or potential is present on the line, and at such times as when the main fuse is blown. The upper ends of the members 40 and 41 are preferably bent so as to diverge from one another.

Referring to the modified form shown in Figs. 7, 8 and 9, the arrangement for connection with the energy or arc dissipating devices 40 and 41 is different. In this arrangement members 33ª similar to the members 33 of the other arrangement, are provided, but members 33ª are not tubular throughout but only at their upper ends to form sockets for receiving the conductors 31 and 32. Below their upper ends the members 33ª are preferably solid and provided with downwardly extending pins 45 which extend well down into the interior chamber or socket of the socket member 2. Sockets 46 preferably in the form of split tubular members formed integrally with the clips 21 and 21ª are provided for the reception of the pins 45, so that when the plug member 1 is inserted into the socket member 2 the pins 45 will pass into the sockets 46 as shown in Fig. 7 and thereby form an electric connection between the line and the arc discharging or dissipating devices. The pins 45 are preferably of such length that they enter the sockets 46 before the clips 21, 22, etc., enter the jaws 24, 25, thereby making connection with the horns 50 before the line fuse is connected in circuit. This gives the very desirable result that it prevents a bad explosion in front of the operator's eyes, in case the device receives an overload current while he is inserting the plug. In such case the rebound, with the resultant arc will go to the horns, relieving the main fuse, which is close to the operator, of the same.

In the modification shown in Figs. 10, 11 and 12, members 33ᵇ are provided and these are made with the socket at their upper ends to receive the conductors from the energy discharging devices and their lower portions are also made in the form of sockets to receive pins 48 carried by the terminals or terminal clips 21, 22, preferably by being made integral with the same.

In the modification shown in Figs. 13 to 16, inclusive, members such as 33 are shown and metallic members such as the arms or horns 50 are shown mounted upon or in the members 33, and constructed with portions 50ª which extend toward one another so as to form an arc discharging or dissipating arrangement with discharge points relatively close together. The upper portions of these members 50 preferably diverge from one another. We also show a fuse device 53 mounted upon the members 50, preferably upon the diverging arm portions thereof. This fuse device is connected electrically with the member 50, as for example by having metallic terminal points 54 which engage eyes or sockets 55 on the members 50. The supplemental or pilot fuse 53 may serve to induce the spark away from the main fuse inside of the socket member 2, and cause it to discharge between the horns 50, thereby getting it outside of the fuse device proper and reducing fire hazard therein. The fuse device 53 is preferably constructed with an inclosed fuse more or less confined in combustible material. Thus an arc passing across the gap of the device may discharge the fuse and may also destroy more or less the combustible material surrounding the same and thus make an indication, which may be seen at a distance, as for example from the ground, when the device is mounted on a pole. The covering or inclosure on the fuse may be of other material if desired, as for example glass, which will be broken on operation and so indicate. The horngap 50—50 is out of the range of action of blowing of the main fuse 6 but is influenced by blowing of the auxiliary fuse 53.

In this form of device also we show a flexible connector 56 carried by the handle 1ª of the plug member 1, and having a detachable engagement as by means of an eye 57 with a hook 58 on the socket 2. This permits the plug member 1 to be held or suspended without being held by the hand when it is removed from the socket 2.

In the modification shown in Fig. 17 an air passage or channel 60 is formed in the plug member 1, and a coöperating or corresponding duct or passage 61 in the socket member 2, and a plug 62 is shown fitted into the top of the duct or passage 61. The duct or passage 60 extends to the fuse 6, and the passage 61 substantially forms a continuation of the passage 60, and extends to the exterior of the casing of the member 2. Thus upon an operation of the fuse the plug 62 may be blown out of the passage 61 and the gases or pressure from the fuse operation discharged through the passage formed by the ducts 60 and 61. In the modification shown in Fig. 18 the ducts or passages 60 and 61 are present but the plug 62 is not shown, the passage 61 being open to the atmosphere. In this case a discharge may take place upon the operation of the fuse or otherwise without the necessity of blowing out a plug. In such case it is desirable to have a shield covering the open end of the passage 61, for which purpose we have shown a shield or covering 63 conveniently formed of insulating material having slots 64 to fit upon the arc or energy dissipating horns 50. This shield may be of combustible material, such as paper or celluloid. The arc may go through the passage 61 and burn the shield making an indication. An arc passing between the horns would burn the member 64, thereby making an indication. Such a member might be used as indicator when there was no passage 61. In Fig. 18ª we show a shield or cover 64ª supported on legs 64ᵇ mounted upon the projection 2ª on the socket 2.

In the modification shown in Fig. 19, the arc dissipating horns 50 are shown and their ends are provided with tips or caps 65 of carborundum or similar material. Thus if an arc is formed between the horn or members 50 and works along the diverging arms of the same to the ends thereof, said ends will be protected by the tips or caps 65 whose material is not injured by the arc, or the arcing terminals of the horns may be made of metal of greater or less resistance, and made to be easily renewable.

In the modification shown in Fig. 20, horns 50 are shown provided at their outer ends with spirally formed conductors 66 which cause the arc as it moves outwardly along said diverging arms to be extended by following the spirals, adding inductance and resistance so as to bring about its termination or destruction.

In the modification shown in Fig. 21, provision is made for an adjustment of the diverging arms 50ª of spark dissipating members, said adjustment being secured by forming each of said arms in two parts and providing adjusting plates 68 with adjusting screws 69 and 70.

It will be understood that changes and modifications may be made without departing from the spirit of the invention.

What we claim is:

1. In combination, a plug member and a socket member, said members having coöperating contacts for closing circuit between them, said plug member comprising a block having fuse connecting terminals mounted upon the top thereof, said terminals being located at opposite extremities of the top; a fuse member connected between the terminals and compressing members of non-conducting material upon opposite sides of the fuse covering substantially the entire length of the fuse between said terminals.

2. In combination, plug and socket members having separable coöperating contacts for closing circuit between them, said plug member comprising a block having fuse connecting terminals mounted upon the top thereof at opposite extremities of the top, a fuse member connected between the terminals, compression members of non-conducting refractory material upon opposite sides of the fuse covering substantially the entire length of the fuse between the terminals, said compression members comprising interengaging baffle portions and spring means for normally pressing said members against said fuse.

3. In a fuse device, a plug member comprising a prismatic block having relatively narrow ends, a clip fastened at the side adjacent each end, each clip having an ear extending over the top of the block adjacent the corresponding end, a fuse connected between the terminals and diagonal ears extending from the edges of the clips, said diagonal ears comprising switch members.

4. In a fuse device, a plug member comprising a prismatic block having relatively narrow ends, clips fastened at the side adjacent each end, said clips having each an ear extending over the top of the block adjacent the corresponding end, a fuse connected between the terminals and compression blocks covering substantially the entire length of the fuse between said terminal, said compression blocks being spring pressed against the fuse, said clips having diagonal ears extending from the edges thereof, said diagonal ears comprising switch members.

5. The combination with plug and socket members of coöperating contacts therefor, the contacts on one member comprising duplex flat projecting clips, and those on the other member comprising duplex jaws provided by metallic blocks with spring clips on each side thereof, the flat clips being adapted to be inserted edgewise between the blocks and the spring clips to provide firm contacts.

6. The combination with plug and socket members of coöperating contacts thereon, the contacts on the plug member comprising metallic strips lying along the side walls of the plug member and extending to the ends of the fuse, and bent laterally so as to form terminals therefor.

7. The combination with plug and socket members and coöperating contacts therefor, of energy dissipating devices and duplex terminals within said socket member, one set of terminals being for line wires and the other set being connected with said energy dissipating devices.

8. The combination with plug and socket members and coöperating contacts therefor, of energy dissipating devices, duplex terminals within said socket member, one set of terminals being for line wires and the other set being for connection with energy dissipating devices, and separate conductors extending to said terminals through the wall of said socket member.

9. The combination with plug and socket members, whereof the plug member carries a fuse, said members being provided with coöperating contacts, of energy dissipating devices located outside of the socket member, conductors extending from said devices through the walls of the socket member, and means for connecting the inner ends of said conductors with the fuse on the plug member before the fuse member is connected with the socket contacts.

10. The combination with plug and socket members, whereof the plug member carries a fuse, said members being provided with coöperating contacts, of energy dissipating devices located outside of the socket member, conductors extending from said devices through the walls of the socket member, and means for connecting the inner ends of said conductors with the fuse on the plug member, said means comprising metallic members on the plug member and other metallic members on the socket member, which members are adapted to be electrically connected with one another when the plug is inserted in the socket and to be electrically disconnected from one another when the plug is withdrawn from the socket.

11. The combination with plug and socket members of metallic members extending through and secured to the wall of the socket member, metallic members carried by the plug member and arranged to make and break connection with said metallic members on the socket member, energy dissipating devices outside of the socket member, connected with said metallic members extending through the wall thereof and line terminals on said socket member adapted to be put in connection with the fuse and the energy dissipating devices when the plug is inserted.

12. The combination, with plug and socket members, of metallic conducting members extending through and secured to the wall of the socket member, metallic contact members carried by the plug member and arranged to make and break connection with said metallic conducting members on the socket member, and energy dissipating devices outside of the socket member connected with said metallic conducting members extending through the wall thereof, a fuse carried by the plug member and fuse terminals connected with said metallic contact members on said plug members, said socket member being provided with coöperating contacts and separate line contact members on the socket member, arranged for connection with the line terminals, the metallic conducting members and said line contact members being unconnected except through said plug contact members.

13. The combination with plug and socket members, whereof the plug member carries a fuse, of energy dissipating devices located outside of the socket members, conductors extending from said devices through the walls of said socket members and three sets of contacts for the plug and socket members, one set for line connection, another set for the terminals of the energy dissipating devices and a third set for the terminals of the fuse, said set of contacts being in electrical conducting relation during normal conditions.

14. In combination, a pair of line terminals, a pair of current interrupting terminals electrically separate from the line terminals, a current interrupting device such as a horngap connected to said current interrupting terminals, a pair of fuse terminals and a fuse between the fuse terminals, said fuse terminals having contact members adapted to connect said line terminals and said current interrupting terminals.

15. In combination, a first set of terminals adapted to be connected to line wires, a second set of terminals electrically separate from the first set, a current interrupting device connected to said second set of terminals, a third set of terminals movable with respect to the first and second sets and adapted first to make contact with the second set and then with both the first set and the second set, and a fusible connecting link between said third set of terminals so that the fusible link and the current interrupting device are normally connected together in parallel to the line.

16. In combination, a first set of stationary terminals adapted to be connected to line wires, a second set of stationary terminals electrically separate from said first set, an auxiliary fuse connected between said second set of terminals, a third set of terminals and a main fuse connected between said third set, said third set of terminals having movable switch means for connecting all three sets of terminals together so that the auxiliary fuse and main fuse are normally connected together in parallel in the line.

17. In combination, a first set of terminals adapted to be connected to line wires, a second set of terminals electrically separate from said first set, an auxiliary fuse connected between said second set of terminals, a third set of terminals, and a main fuse connected between said third set, all of said sets of terminals having switch means, said terminals and switch means being so organized that the switch means of the third set of terminals is movable with respect to the switch means of the other sets and is adapted to connect first the main fuse in parallel with the auxiliary fuse and then to connect both to the line terminals.

18. In combination, stationary switch members, horn electrodes forming a horngap connected to said stationary switch members, line contacts independent of said switch member, movable switch members for making connection with both the stationary switch members and the line contacts, a main fuse connected between said movable switch members, and an auxiliary fuse connected across the horn electrodes.

19. In combination, stationary switch members, horn electrodes forming a horngap connected to said stationary switch members, movable switch members, an inclosed main fuse connected between said movable switch means, and an auxiliary fuse connected across the horngap and adapted to be blown when the main fuse blows, to give an indication of the operation of the inclosed fuse.

20. In combination, a plug, a socket for the plug, coöperating contacts for said plugs and said sockets, a fuse mounted on said plugs and connected to the plug contact, compression blocks spring-pressed on each side of the fuse, a horngap mounted on the socket and having separate contact within the socket and adapted to be connected to the plug contact and to the socket contact when the plug is inserted and an auxiliary fuse connected across the horngap.

21. The combination of a main fuse device comprising a fuse arranged for inclusion in a line circuit, an energy dissipating device comprising separated conducting members arranged for discharge purposes, said members being connected in parallel with said line fuse and out of the range of action of the same, and a second fuse connected between and in parallel with said discharging members, said second fuse being immediately adjacent and connected to the discharging members.

22. The combination of a fuse device comprising an inclosed main fuse arranged for inclusion in a line circuit and adapted to carry the major portion of the current, an energy dissipating device comprising separated conducting members arranged for discharging purposes, said members being connected in parallel with said line fuse but being out of range of action of the same, and a second fuse connected to and between said discharging members, said second fuse being provided with indicating means, 23. The combination of a fuse device comprising an inclosed main fuse arranged for inclusion in a line circuit, an energy dissipating device comprising separated conducing members arranged for discharging purposes, said members being connected in parallel with said line fuse, and a second fuse connected to and between said discharging members, said second fuse being provided with indicating means, consisting of a covering of combustible material.

24. A fuse device comprising plug and socket members, whereof the plug member is provided with a line fuse, said members being provided with coöperating contacts, an energy dissipating device comprising separated spark gap forming conducting members connected with the contacts of said socket, and a supplemental or secondary fuse of relatively small capacity connected between said separated conducting members.

25. In combination a fuse device comprising separable members, one of which carries a fuse, of line terminals on the other member, energy dissipating devices arranged outside of said fuse device and having terminals on the member not carrying the fuse, said separable members being provided with coöperating contacts to connect said energy dissipating devices with the fuse and then with the line terminals when said members are brought together and disconnect the same when said members are separated.

In witness whereof, we hereunto subscribe our names this 18th day of August A. D. 1915.

EDMUND O. SCHWEITZER.
ALFRED HERZ.

Witness:
A. LYDA JONES.